United States Patent
Qiang et al.

(10) Patent No.: US 10,628,051 B2
(45) Date of Patent: Apr. 21, 2020

(54) REDUCING A DATA STORAGE DEVICE BOOT TIME

(71) Applicant: Seagate Technology LLC, Cupertino, CA (US)

(72) Inventors: Jian Qiang, Singapore (SG); Tan Choon Kiat, Singapore (SG); Shen Jin Quan, Singapore (SG); Chng Yong Peng, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/034,591

(22) Filed: Jul. 13, 2018

(65) Prior Publication Data
US 2020/0019322 A1    Jan. 16, 2020

(51) Int. Cl.
*G06F 3/06* (2006.01)

(52) U.S. Cl.
CPC ............ *G06F 3/0611* (2013.01); *G06F 3/065* (2013.01); *G06F 3/068* (2013.01); *G06F 3/0634* (2013.01); *G06F 3/0658* (2013.01)

(58) Field of Classification Search
CPC ...... G06F 3/0611; G06F 3/0658; G06F 3/065; G06F 3/0634; G06F 3/068
See application file for complete search history.

(56) References Cited

U.S. PATENT DOCUMENTS

| | | |
|---|---|---|
| 6,920,533 B2 | 7/2005 | Coulson et al. |
| 7,203,830 B2 | 4/2007 | Fortin et al. |
| 7,398,382 B2 | 7/2008 | Rothman et al. |
| 8,719,389 B2 | 5/2014 | Domsch et al. |
| 8,984,267 B2 | 3/2015 | Tearse-Doyle |
| 9,071,587 B2 | 6/2015 | Heninger et al. |
| 9,355,101 B2 | 5/2016 | Waites |
| 9,477,409 B2 | 10/2016 | Ramanujan et al. |
| 9,836,306 B2 | 12/2017 | Baratam et al. |
| 9,946,067 B1 | 4/2018 | Bamberger et al. |
| 2007/0038850 A1 | 2/2007 | Matthews et al. |
| 2011/0296123 A1* | 12/2011 | Adler ............... G06F 12/0246 711/156 |
| 2015/0089102 A1 | 3/2015 | Kumar et al. |
| 2017/0262198 A1* | 9/2017 | Nakata ............... G06F 3/0619 |
| 2018/0059931 A1* | 3/2018 | Rueger .............. G06F 12/08 |
| 2019/0188091 A1* | 6/2019 | Christiansen ...... G06F 11/1469 |

* cited by examiner

*Primary Examiner* — Hiep T Nguyen
(74) *Attorney, Agent, or Firm* — Westman, Champlin & Koehler, P.A.

(57) ABSTRACT

A data storage device includes a data storage medium and a controller. The controller performs a boot-up sequence that includes operations that transition the data storage device from a lower operational state to a higher operational state in which the data storage device is ready to service host commands. The controller also carries out metadata updating operations independently of the boot-up sequence operations. Carrying out the metadata updating operations independently of the boot up sequence operations prevents the metadata updating operations from substantially contributing to a boot-up time.

17 Claims, 5 Drawing Sheets

REDUCING A DATA STORAGE DEVICE BOOT TIME

BACKGROUND

Data storage devices are typically included in systems having one or more host computers. Examples of data storage devices include hard disk drives (HDDs), which are electromechanical devices containing spinning disks and movable read/write heads, solid state drives (SSDs), which use memory chips and contain no moving parts, and hybrid drives, which combine features of HDDs and SSDs in one unit.

SUMMARY

In one embodiment, a data storage device is provided. The data storage device includes a data storage medium and a controller. The controller performs a boot-up sequence that includes operations that transition the data storage device from a lower operational state to a higher operational state in which the data storage device is ready to service host commands. The controller also carries out metadata updating operations independently of the boot-up sequence operations. Carrying out the metadata updating operations independently of the boot up sequence operations prevents the metadata updating operations from substantially contributing to a boot-up time.

In another embodiment, a method is provided. The method includes performing, in a data storage device, a boot-up sequence comprising operations that transition the data storage device from a lower operational state to a higher operational state in which the data storage device is ready to service host commands. The method also includes carrying out metadata updating operations independently of the boot-up sequence operations. Carrying out the metadata updating operations independently of the boot up sequence operations prevents the metadata updating operations from substantially contributing to a boot-up time.

In yet another embodiment, a data storage device is provided. The data storage device includes a data storage medium and a controller. The controller performs a boot-up sequence that includes operations that transition the data storage device from a lower operational state to a higher operational state in which the data storage device is ready to service host commands. The controller also carries out metadata updating operations independently of the boot-up sequence operations and during an idle time of the data storage device.

This summary is not intended to describe each disclosed embodiment or every implementation of the data storage device boot time reduction technique described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure generally relate to reducing boot time in data storage devices.

Computers typically include data storage devices (e.g., hard disc drives (HDDs), solid state drives (SDDs), hybrid drives, etc.). Generally, both a computer and a data storage device included in the computer have a lower operational state (e.g., an "off" state) and a higher operational state (e.g., an "on" state or an active state). When transitioning from the lower operational state to the higher operational state the computer and the data storage device are booted. Booting the computer and the data storage device includes executing low-level code (e.g., boot code) to configure components of the computer and the data storage device for operation and control by higher-level software, such as firmware, operating system, or applications. This typically involves performing a sequence of operations that are referred to herein as boot up sequence operations. Reducing boot time is desirable to enhance an end user experience.

When a data storage device (e.g., a HDD) is initially installed in a host computer, the data storage device may have a relatively small amount of metadata (e.g., a relatively small logical to physical mapping table). However, over time, data storage devices accumulate large amounts of metadata that enable efficient data management and thereby help with data storage device performance. This is especially true in shingled magnetic recording (SMR) data storage devices, which utilize dynamic logical block address (LBA) mapping schemes (e.g., media cache) and journaling that employ large amounts of metadata. Currently, a data storage device boot-up sequence includes metadata updating operations, which can contribute substantially to the boot time.

Embodiments of the disclosure reduce boot time in data storage devices by decoupling metadata updating operations from other boot-up sequence operations, and performing the metadata updating operations independently of the boot-up sequence operations. An example of a data storage device in which metadata updating operations may be decoupled from other boot-up operations is described below in connection with FIG. 1.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1:
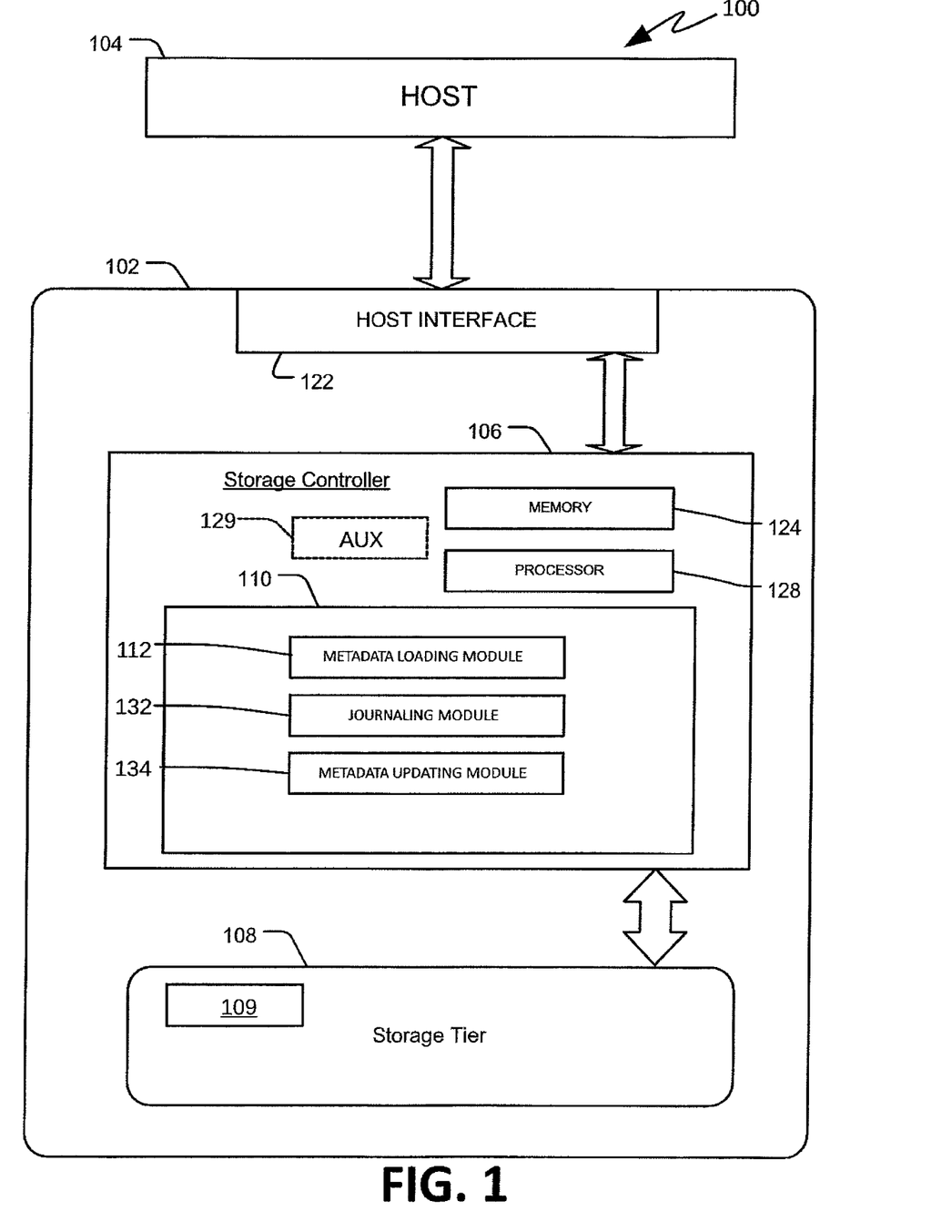
FIG. 1 is a block diagram of an example apparatus having a data storage device in accordance with one embodiment.

FIG. 1 is a block diagram of an example apparatus 100 that includes a data storage device 102 in accordance with one embodiment. Data storage device 102 includes a storage controller or control circuit 106 that communicatively couples a storage tier 108 to a host 104 via a host interface 122. In an implementation, the storage tier 108 is a dynamic storage tier. The storage controller 106 provides a mechanism to allow the host 104 to store data to and retrieve data from the storage tier 108. In an implementation, the storage tier 108 may be a main data store. The storage tier 108 may include without limitation one or more of magnetic data storage discs, optical data storage discs, non-volatile random access memory (RAM), such as NAND flash memory and a volatile RAM storage medium such as dynamic random access memory (DRAM). The storage tier 108 may include a reserved area 109 in which metadata (e.g., one or more logical to physical mapping tables) may be stored.

The storage controller 106 may utilize communication interfaces and protocols including SATA (serial advanced technology attachment), SCSI (small computer system interface), eSATA (external serial advanced technology attachment), SAS (serial attached SCSI), USB (universal serial bus), and others to communicate with the host 104 via the host interface 122. The storage controller 106 also includes a metadata management module 110 that carries out metadata loading, processing, synchronization, etc.

As can be seen in FIG. 1, the storage controller 106 also includes a memory 124 that may be used for storing data and/or one or more modules such as 110 in some embodiments. It should be noted that, in different embodiments, module 110 may comprise hardware, software and/or firmware. In one embodiment, the memory 124 may serve as a system memory into which metadata such as logical to physical mapping tables are stored. In other embodiments, a separate memory or memory section 127 may serve as the system memory into which metadata such as logical to physical mapping tables are stored. In one embodiment, the system memory (e.g., 124 or 127) may include a DRAM. The storage controller 106 further includes a processor/control circuit 128. The processor 128 may perform functions of the storage controller 106 including functions disclosed herein as performed by module 110. The processor 128 may execute instructions stored on non-transitory computer readable media to perform the functions of the storage controller 106.

In one embodiment, module 110 may include multiple sub-modules. The sub-modules may include a metadata loading module 112, a journaling module 114 and a metadata updating module 116. Metadata loading module 112 is capable of loading a copy of metadata from reserved area 109 into either memory 124 or memory 127. Journaling module 114 manages journaling information (e.g., mapping information from host commands which, upon execution, result in changes to metadata (e.g., logical to physical mapping changes)). Metadata updating module 116 is capable of processing pending metadata updates from journaling module 114 and modifying the metadata loaded by metadata loading module 112 according to the pending metadata updates. Metadata updating module 116 is also capable of storing updated metadata in reserved area 109. In one embodiment, metadata updating module 116 updates a metadata master table in reserved area 109.

Upon power-on reset of the data storage device 102 and before the data storage device 102 is ready for host commands, metadata loading module 112 loads a copy of metadata from reserved area 109 into either memory 124 or memory 127. The loading of the metadata is carried out as part of a boot up sequence in data storage device 102. However, in data storage device 102, metadata updates are decoupled from the boot-up path and are carried out, for example, during an idle time or during a power mode transition (e.g., during a transition from a first power level for normal operation of device 102 to a second reduced power level). The updates are carried out by metadata updating module 116 which, as indicated above, processes pending metadata updates from journaling module 114 and modifies the metadata loaded by metadata loading module 112 according to the pending metadata updates. In certain applications that have heavy loads (e.g., network-attached storage (NAS) web servers), there may be no idle time for metadata updates in data storage device 102. In such embodiments, a parallel task is set up to process the metadata once a predetermined threshold (e.g., a predetermined number of pending metadata updates) is met. The parallel task may be executed by the main processor (e.g., processor 128) or by an auxiliary processor. An optional auxiliary processor is denoted by reference numeral 129 in FIG. 1.

Figure 2:
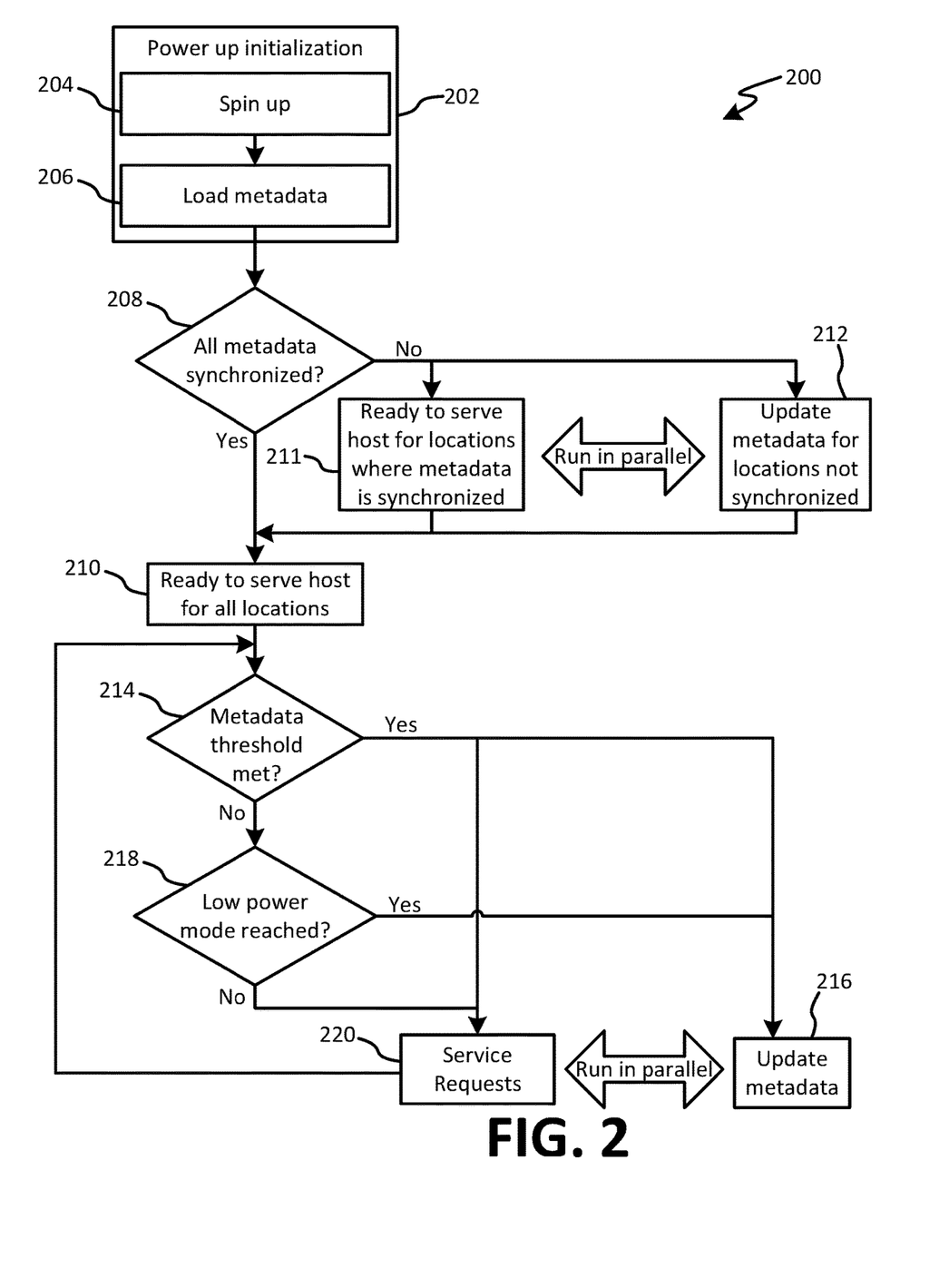
FIG. 2 is a flow diagram of a method of reducing a data storage device boot time in accordance with one embodiment.

FIG. 2 is a flowchart showing a metadata management method 200 carried out in a data storage device (such as 102 of FIG. 1) in accordance with one embodiment. At block 202, data storage device power up initialization is carried out. The device power up initialization may involve performing a sequence of operations that help the data storage device transition from a lower operational state (e.g., an "off" state) to a higher operational state. If the data storage device is a HDDs or a hybrid drive, a disc spin up operation 204 may be a part of the power up initialization. Also, for data storage devices such as HDDs, SSDs and hybrid drives, a copy of metadata from a reserved area (e.g., reserved area 109 of FIG. 1) is loaded into a system memory (e.g., memory 124 or memory 127 of FIG. 1). The metadata loading operation is denoted by reference numeral 206 in FIG. 2. At block 208, a determination is made as to whether all the loaded metadata is current. This may involve determining whether there are any pending metadata updates in a journaling system of the data storage device (e.g., journaling module 114 of FIG. 1). If all the loaded metadata is current (e.g., there are no pending metadata updates in the journaling system), the data storage device is ready to service commands from a host (e.g., commands from host 104 of FIG. 1) as indicated by block 210. If at least some of the loaded metadata is not current (e.g., there are pending metadata updates in the journaling system), control moves to block 212. At block 212, the loaded metadata is updated (e.g., by metadata updating module 116). As indicated earlier, the updating of the metadata is decoupled from the loading of the metadata and therefore the updating of the metadata may be carried out as a parallel task. Accordingly, when the metadata updates are taking place at block 212, the data storage device at block 211 is capable of servicing host commands that are directed to data storage locations whose associated metadata is current. When the update process is complete, at block 210 the data storage device is ready to service host commands that are directed to any data storage locations in the data storage device.

During operation of the data storage device, changes to metadata are recorded as journaling information. The loaded metadata at 206 is not continuously updated with the changes to the metadata. However, at block 214, when a determination is made that the changes to the metadata have reached a predetermined threshold, the loaded metadata is updated with the changes at block 216 that is a parallel task to servicing requests at block 220. If, at block 214, a determination is made that the changes to the metadata have not reached the predetermined threshold, control passes to block 218. At block 218, a determination is made as to whether the data storage device is in an idle state. This may involve determining whether the data storage device has not received any host commands for a predetermined amount of time. If, at block 218, the data storage device is found to be in an idle state, control passes to block 216 where the loaded metadata is updated. If the data storage device is found not to be in an idle state, servicing of host commands continues as shown in block 220.

Figure 3A:
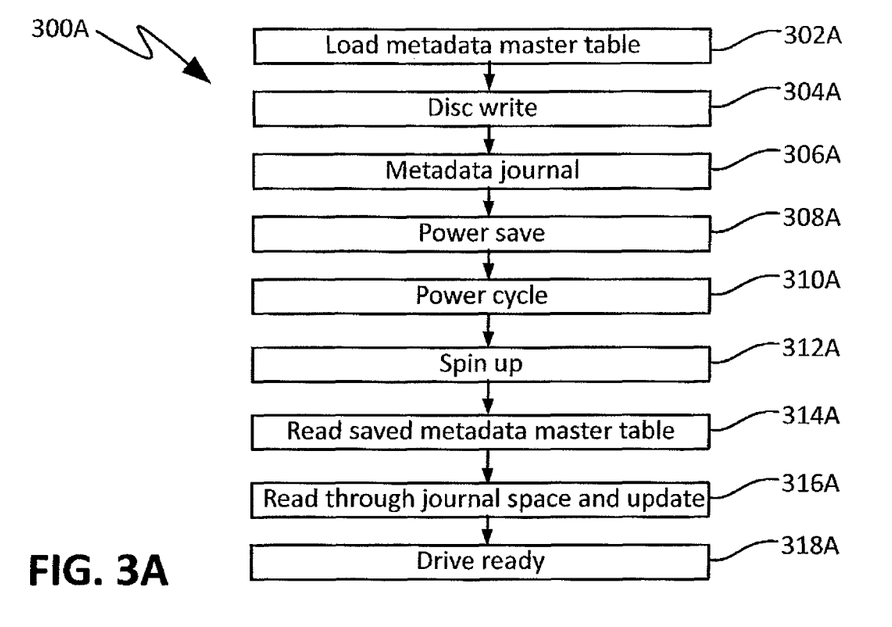
FIGS. 3A and 3B illustrate a comparison of metadata management operations carried out in first and second disc drives.
Figure 3B:
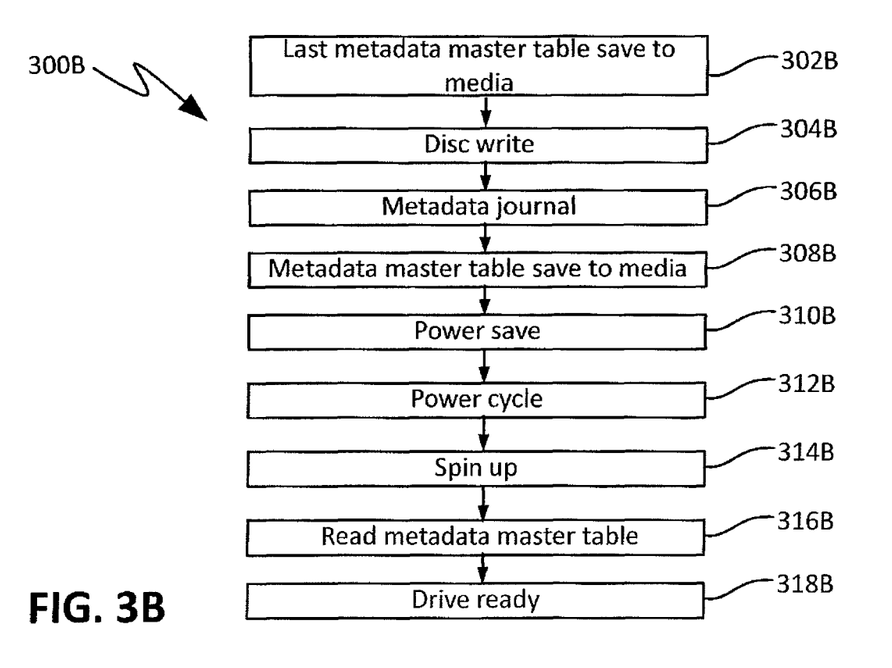

FIGS. 3A and 3B illustrate a comparison of metadata management operations carried out in first and second disc drives. FIG. 3A includes operations 300A carried out in a first disc drive. Operation 302A is a last save/commit operation of an updated metadata master table to a data storage disc. Operation 304A is a write operation that stores user data to a data storage disc. Operation 306A involves journaling of metadata changes due to the write operation 304A. Operation 308A places the first disc drive in a power save mode. Operation 310A power cycles the first disc drive. Operation 312A is a disc spin up operation upon power up of the first disc drive. Operation 314A involves reading/loading the metadata master table. Operation 316A includes reading through a journaling space for metadata changes and updating the read/loaded metadata master table to reflect the metadata changes. This operation in the first disc drive is carried out as part of the boot up sequence of the first disc drive (e.g., before the first disc drive is ready to service host commands at 318A) and can cost about 50 milliseconds (ms) to about 500 ms depending on a size of the metadata that is changed. As will be described below in connection with FIG. 3B, to address the metadata update-related time delay in the boot up, metadata is processed/updated when the device in in an idle state.

FIG. 3B includes operations 300B carried out in a second disc drive in accordance with one embodiment. Operation 302B is a save/commit operation of an updated metadata master table to a data storage disc. Operation 304B is a write operation that stores user data to a data storage disc. Operation 306B involves journaling of metadata changes due to the write operation 304B. Operation 308B updates the metadata master table to reflect the metadata changes due to the write operation 304B. Operation 310B places the second disc drive in a power save mode. Operation 312B power cycles the second disc drive. Operation 314B is a disc spin up operation upon power up of the second disc drive. Operation 316B involves reading/loading the saved metadata master table. The second disc drive is ready to service host commands at 318B upon completion of the operation 316B. By pre-processing metadata at 308B before the power cycle at 312B, operation 316A carried out during boot up on the first disc drive is eliminated from the boot up sequence of the second disc drive, thereby substantially reducing readying time of the second disc drive.

Figure 4:
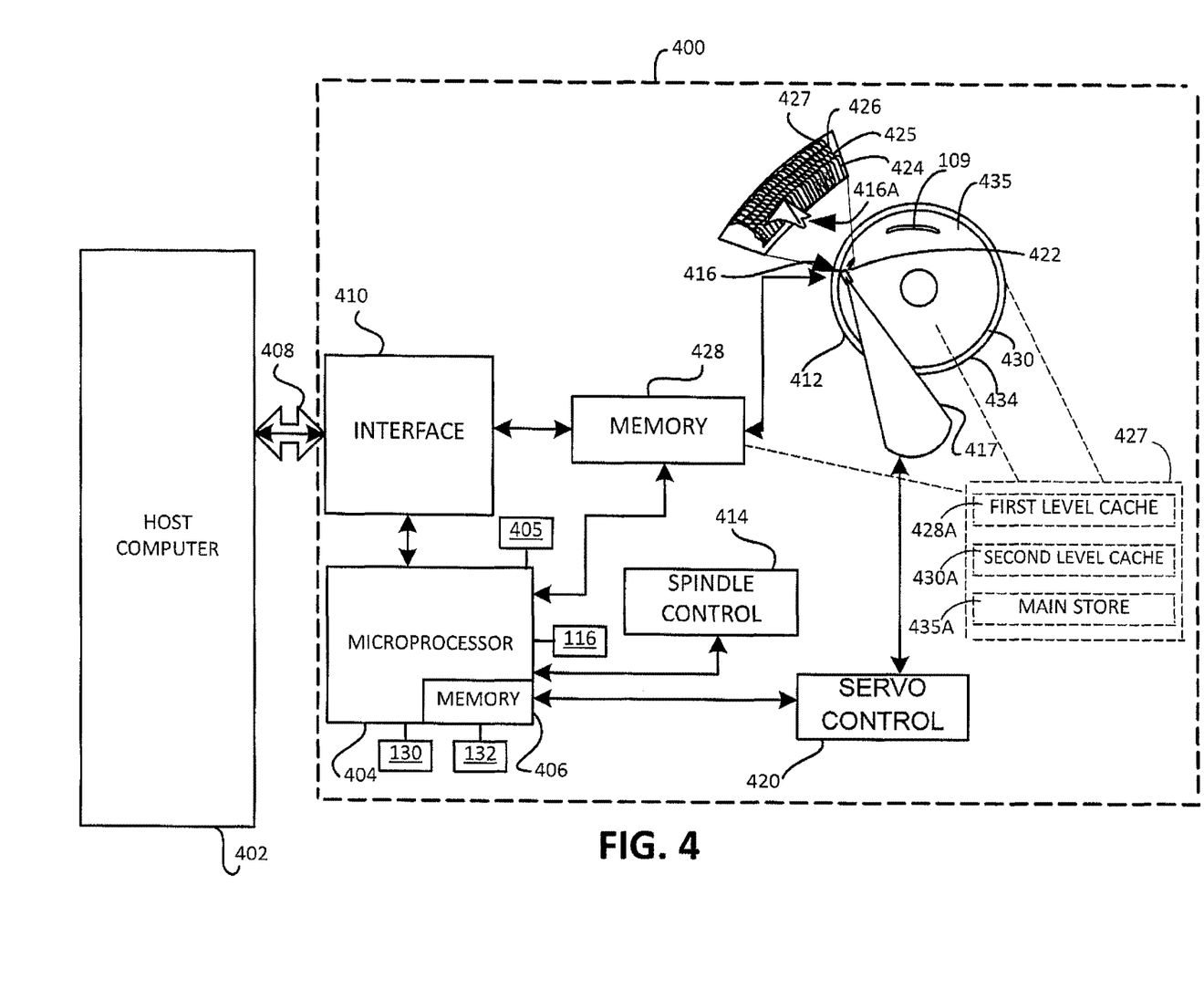
FIG. 4 is a block diagram of a hard disc drive that employs a method of reducing boot time in accordance with one embodiment.

FIG. 4 shows a block diagram of a disc drive 400 that carries out metadata management in accordance with one embodiment. Disc drive 400 is a particular example of a data storage or memory device 108. As will be described in detail further below, in one embodiment, disc drive 400 employs one or more discs on which multiple data tracks may be written in a partially-overlapping shingled pattern, with each successive track overwriting a portion of the previous track.

Disc drive 400 is shown in FIG. 4 to be operably connected to a host computer 402 in which disc drive 400 may be mounted. Disc drive 400 includes a microprocessor system 404 that generally provides top level communication and control for disc drive 400 in conjunction with programming for microprocessor system 404 stored in microprocessor memory 406. Disc drive 400 may communicate with host computer 402 using a bus 408.

Memory 406 can include RAM, read only memory ROM, and other sources of resident memory for microprocessor 404. Disc drive 400 includes one or more data storage discs 412. Discs 412 are rotated at a substantially constant high speed by a spindle control circuit 414. One or more heads 416 communicate with the surface(s) of discs 412 to carry out data read/write operations. The radial position of heads 416 is controlled through the application of current to a coil in an actuator assembly 417. A servo control system 420 provides such control.

As noted above, in some embodiments, tracks may be written on one or more storage discs 412 in a partially-overlaying relationship. The overlaying of tracks is shown in close-up view of area 422 of disc(s) 412. In area 422, a corner of head 416A is shown writing a track portion 424. Different shading within the track portion 424 represents different magnetic orientations that correspond to different values of stored binary data. The track portion 424 is overlaid over part of track portion 425. Similarly, track portion 425 is overlaid over part of portion 426, portion 426 is overlaid over portion 427, etc.

The portions 424-427 may be part of what is referred to herein as a physical band which, in this embodiment, may include tens, hundreds or thousands of similarly overlapping, concentric portions 424-427. Gaps are created between such physical bands so that each physical band can be updated independently of other physical bands. The overlaying of successive track portions within a physical band in shingled magnetic recording (SMR) means that individual parts of the physical band may not be randomly updated on their own. This is because spacings between centers of track portions 424, 425, 426, 427, for example, are smaller than a width of a write pole (not separately shown) of head 416. However, a width of a reader (not separately shown) of head 416 may be small enough to read individual track portions 424, 425, 426, 427, thereby enabling random reads of data to be carried out.

In certain embodiments, disc drive 400 includes a memory 428 that may serve as, for example, a first/upper level cache denoted by reference numeral 428A. In some embodiments, memory 428 is physically separate from discs 412. The memory 428 may be of a different type than the discs 412. For example, in certain embodiments, memory 428 may be constructed from solid-state components. In one embodiment, memory 428 may be a Flash memory or a DRAM.

In some embodiments, the one or more storage discs 412 are managed as non-overlapping disc portion 430 and disc portion 435. In some embodiments, disc portion 430 is used for a second level cache denoted by reference numeral 430A and disc portion 435 serves as a main store denoted by reference numeral 435A. In an alternate embodiment, each of the first level cache 428A, the second level cache 430A and the main store 435A may be allocated from a pool of memory locations that includes, for example, storage locations from memory 428 and storage locations or physical bands from storage discs 412. Dashed box 427 of FIG. 4A indicates that, in the alternate embodiment, the entire set of storage locations that constitutes the storage space supplied by disc(s) 412 and memory 428 in disc drive 400 may be organized for three uses, namely the first level cache 428A, the second level cache 430A and main store 435A.

In the embodiment of FIG. 4, disc drive 400 may use memory 428 in conjunction with disc portion 430 in order to manage data as the data is being transferred to main storage locations 435 on disc(s) 412. In the interest of simplification, components such as a read/write channel which encodes data and provides requisite write current signals to heads 416 is not shown in FIG. 4. Also, any additional buffers that may be employed to assist in data transfer to the memory 428 and the main storage locations 435 are not shown in the interest of simplification.

As noted above, SMR may be used for storage in disc portion 430, which serves as second-level cache 430A. Also, as can be seen in FIG. 4A, main storage locations 435 are on a same data storage medium as the second-level cache locations 430. Thus, in the embodiment of FIG. 4A, second-level cache 430A is a media cache.

A SMR media cache such as 430A may rely on a high cleaning throughput to improve the host write throughput. Accordingly, a large number of extents (e.g., 2 million nodes per 1 TB of capacity) may be enabled, with each extent having a corresponding mapping element. The large number of mapping elements substantially increases metadata updates.

Accordingly, the embodiment of FIG. 4 employs a metadata loading module 112, a journaling module 114 and a metadata updating module 116 in a manner described above, such that metadata loading operations are decoupled from metadata updating operating operations, thereby reducing boot time. Metadata loading module 112, journaling module 114 and metadata updating module 116 may be part of microprocessor system 404 or may be separate components coupled to microprocessor system 404. Modules 112, 114 and 116 operate in a manner described above in connection with FIG. 1 and carry out the metadata updates, for example, during and idle time of disc drive 400. Therefore, in the interest of brevity, a detailed description of modules 112, 114 and 116 is not repeated in connection with FIG. 4. It should be noted that, in some embodiments, an auxiliary processor 405 may be employed to carry out metadata updates in parallel when microprocessor 404 is servicing host commands.

Figure 5:
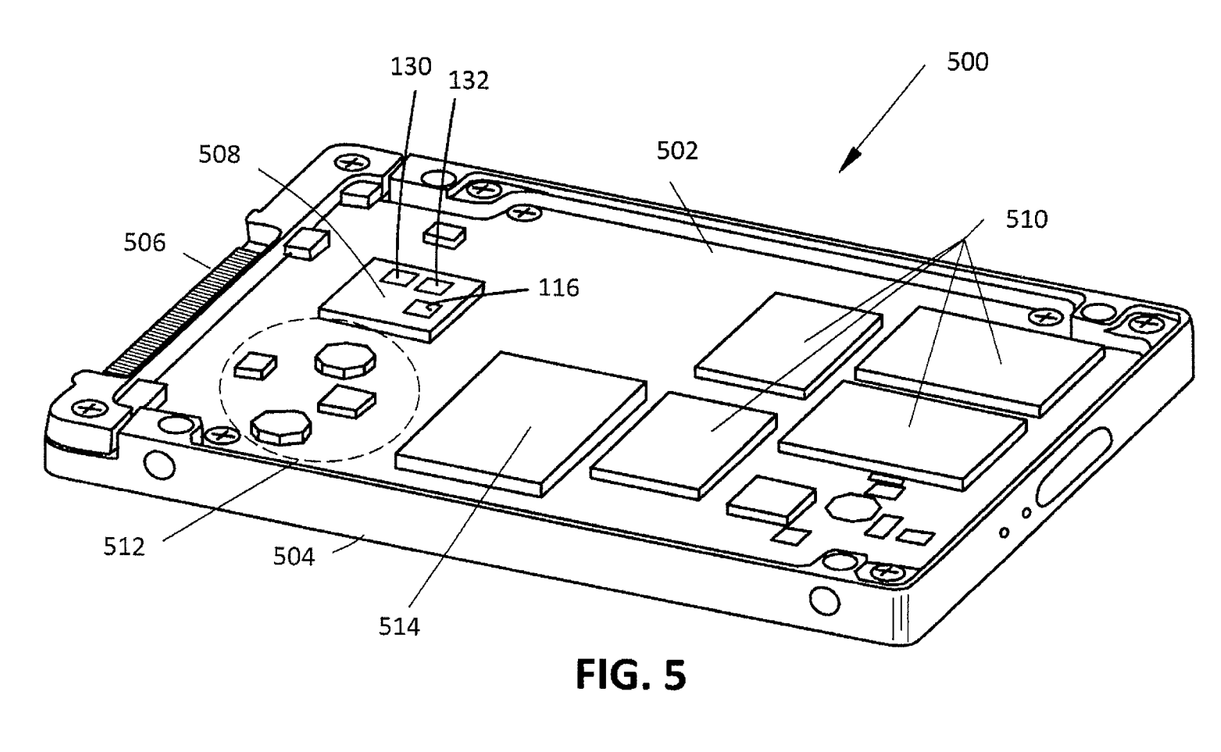
FIG. 5 is an isometric view of a solid-state drive that employs a method of reducing boot time in accordance with one embodiment.

FIG. 5 illustrates an oblique view of a solid state drive (SSD) 500 in which the presently disclosed metadata management technique described above in connection with FIGS. 1 and 2 is useful. SSD 500 includes one or more circuit card assemblies 502 and typically includes a protective, supportive housing 504, a top cover (not shown), and one or more interface connectors 506. SSD 500 further includes a controller ASIC 508, one or more non-volatile memory devices 510, and power regulation circuitry 512. The memory devices 510 are essentially the SSD's data storage media for the caches and main store. In some applications, SSD 500 further includes a power-backup energy storage device, such as a super-capacitor 514.

In accordance with certain aspects, the solid-state drive 500 includes a circuit card assembly 502 that includes a connector 506 for connection to a host computer. In accordance with certain aspects, the connector 506 includes a NVMe (non-volatile memory express), SCSI, SAS, FC-AL (fiber channel arbitrated loop), PCI-E (peripheral component interconnect express), IDE (integrated drive electronics), AT (advanced technology), ATA (advanced technology attachment), SATA, IEEE (institute of electrical and electronics engineers)-1394, USB or other interface connector adapted for connection to a host.

If, as shown in FIG. 5, more than one non-volatile memory device 510 is included in SSD 500, then one of the non-volatile memory devices 510 may be used as the first level cache. Physical storage locations (for example, erasure blocks) in the other one or more non-volatile memory devices 510 may be utilized as second level cache and as main storage locations. In other embodiments, physical storage locations in the one or more non-volatile memory devices 510 may serve a pool of physical bands for assignment to first level cache, second level cache and main storage. In SSD 500, controller ASIC 508 may include a metadata loading module 112, a journaling module 114 and a metadata updating module 116 that operate in a manner described above.

In accordance with various embodiments, the methods described herein may be implemented as one or more software programs running on one or more computer processors or controllers, such as those included in devices 100, 400 and 500. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
a data storage medium; and
a controller configured to:
perform a boot-up sequence comprising operations that transition the data storage device from a lower operational state to a higher operational state in which the data storage device is ready to service host requests; and
carry out metadata updating operations in parallel with servicing host requests when a predetermined threshold of pending metadata updates is reached, thereby preventing the metadata updating operations from substantially contributing to current and future boot-up times.

2. The data storage device of claim 1 and wherein the boot-up sequence of operations performed by the controller further comprises a metadata loading operation that is different from the metadata updating operations.

3. The data storage device of claim 1 and wherein the controller is further configured to carry out the metadata updating operations during a data storage device idle time.

4. The data storage device of claim 1 and wherein the controller is configured to carry out the metadata updating operations in parallel with the servicing of the host requests when the servicing of the host requests are for data storage locations where associated metadata is current.

5. The data storage device of claim 1 and wherein the metadata updating operations are carried out in parallel with the servicing of the host requests by a same processor.

6. The data storage device of claim 1 and wherein the servicing of the host requests are carried out by a first processor and the metadata updating operations are carried out in parallel by a second processor.

7. A method comprising:
performing, in a data storage device, a boot-up sequence comprising operations that transition the data storage device from a lower operational state to a higher operational state in which the data storage device is ready to service host requests; and
preventing metadata updating operations from substantially contributing to current and future boot-up times by carrying out the metadata updating operations in parallel with servicing host requests when a predetermined threshold of pending metadata updates is reached.

8. The method of claim 7 and wherein performing the boot-up sequence, of operations comprises performing a metadata loading operation that is different from the metadata updating operations.

9. The method of claim 7 and wherein preventing metadata updating operations from substantiality contributing to current and future boot-up times further comprises carrying out the metadata updating operations during a data storage device idle time.

10. The method of claim 7 and further comprising carrying out the metadata updating operations in parallel with servicing host requests when the servicing of the host requests are for data storage location locations where associated metadata is current.

11. The method of claim 7 and wherein the metadata updating operations are carried out in parallel with the servicing of the host requests by a same processor.

12. The method of claim 7 and wherein the servicing of the host requests are carried out by a first processor and the metadata updating operations are carried out in parallel by a second processor.

13. A data storage device comprising:
a data storage medium; and
a controller configured to:
perform a boot-up sequence comprising operations that transition the data storage device from a lower operational state to a higher operational state in which the data storage device is ready to service host requests; and
carry out metadata updating operations in parallel with servicing host requests when a predetermined threshold of pending metadata updates is reached, wherein the servicing of the host requests are for data storage locations where associated metadata is current.

14. The data storage device of claim 13 and wherein the metadata updating operations comprise updating a metadata master table stored on the data storage medium.

15. The data storage device of claim 13 and wherein the controller is further configured to load a copy of the metadata master table into a data storage device memory that is of a different memory type than the data storage medium, and wherein the controller is configured to perform the loading of the copy of the metadata master table into the data storage device memory as part of the boot-up sequence.

16. The data storage device of claim 15 and wherein the data storage device memory comprises a solid-state memory and the data storage medium comprises a data storage disc.

17. The data storage device of claim 13 and wherein the controller is further configured to carry out the metadata updating operations in parallel with the servicing of the host requests when a predetermined threshold of pending metadata updates is reached.

* * * * *

UNITED STATES PATENT AND TRADEMARK OFFICE
CERTIFICATE OF CORRECTION

Page 1 of 1

PATENT NO. : 10,628,051 B2
APPLICATION NO. : 16/034591
DATED : April 21, 2020
INVENTOR(S) : Jian Qiang et al.

It is certified that error appears in the above-identified patent and that said Letters Patent is hereby corrected as shown below:

On the Title Page

Under abstract "17 Claims, 5 Drawing Sheets" should read --16 Claims, 5 Drawing Sheets--.

In the Claims

In Column (10), delete Lines 51-55 (Claim 17).

Signed and Sealed this
Seventeenth Day of November, 2020

Andrei Iancu
*Director of the United States Patent and Trademark Office*